United States Patent [19]
Van Epps, II et al.

[11] Patent Number: 5,113,800
[45] Date of Patent: May 19, 1992

[54] NESTABLE LIVESTOCK WATERING TANK WITH REMOVABLE DRINKER TRAY

[75] Inventors: James L. Van Epps, II; Lynn Van Epps, both of Portage, Wis.

[73] Assignee: Freeland Industries, Inc., Portage, Wis.

[21] Appl. No.: 735,081

[22] Filed: Jul. 24, 1991

[51] Int. Cl.⁵ .............................................. A01K 7/04
[52] U.S. Cl. ........................................................ 119/78
[58] Field of Search .................. 119/78, 79, 80, 73, 119/74; 206/519

[56] References Cited

U.S. PATENT DOCUMENTS

| | | | |
|---|---|---|---|
| 901,730 | 10/1908 | Norquist | 119/79 |
| 1,062,792 | 5/1913 | Nelson | 119/28 |
| 1,711,800 | 5/1929 | Markey | 119/73 |
| 2,345,400 | 3/1944 | Laughead et al. | 119/73 |
| 2,532,999 | 12/1950 | Donahoe et al. | 119/78 |
| 2,860,601 | 11/1958 | Stein | 119/78 |
| 3,077,284 | 2/1963 | McLaughlin | 206/519 |
| 3,529,743 | 9/1970 | Ehrbar et al. | 206/519 |
| 4,082,184 | 4/1978 | Hammer | 206/519 |
| 4,664,347 | 5/1987 | Brown et al. | 206/519 |
| 4,739,727 | 4/1988 | Boyer | 119/73 |

Primary Examiner—Robert P. Swiatek
Assistant Examiner—Todd E. Manahon
Attorney, Agent, or Firm—Ezra Sutton

[57] ABSTRACT

A livestock watering tank has a main tank and a drinker tray disposed below the main tank. Both the main tank and the tray are formed of molded plastic to prevent corrosion and for easy cleaning. The tanks are nestable for easy shipping and storage.

4 Claims, 3 Drawing Sheets

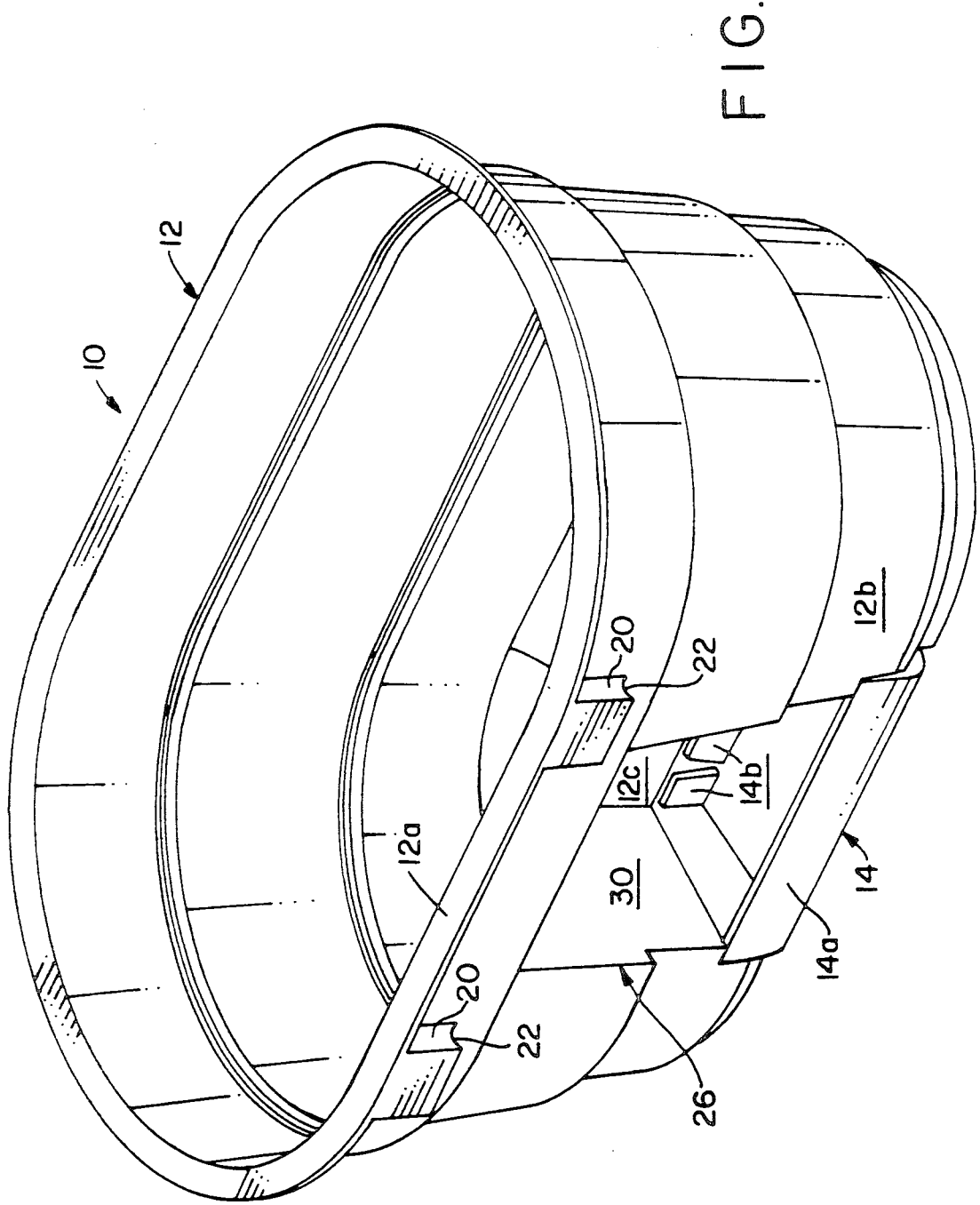

NESTABLE LIVESTOCK WATERING TANK WITH REMOVABLE DRINKER TRAY

FIELD OF THE INVENTION

The present invention relates to a livestock watering tank which is formed of molded plastic to prevent corrosion.

BACKGROUND OF THE INVENTION

Typically, livestock watering tanks have been made of metal, which have a tendency to corrode over time and are difficult to clean. Also, such tanks cannot be disassembled, which add to the difficulty in cleaning. As a result, metal watering tanks have a tendency to build up bacteria and transmit diseases to the animals drinking from them.

Thus, it is within the contemplation of the present invention to provide a plastic watering tank which overcomes the aforesaid problems, avoids corrosion, may be easily disassembled for cleaning, is easy to clean, has a longer life expectancy, is less likely to breed diseases, and costs about the same to manufacture as a metal tank.

SUMMARY OF THE INVENTION

In accordance with the present invention, there is provided a livestock watering tank which includes a main tank for receiving water, and a drinker tray mounted on the bottom of the main tank for livestock to drink water from. Both are formed of molded plastic to prevent corrosion. Water is supplied from the tank to the drinker tray, and a float valve controls the supply of water from the tank to the drinker tray.

The tank is shaped so as to be nestable with another tank, and nesting members are formed on the side of the tank to allow one tank to nest inside of of another tank and to space the tops of the tanks apart a predetermined amount. One side of the tank is indented above the drinker tray to form a section for receiving an animal's head to drink from the drinker tray.

BRIEF DESCRIPTION OF THE DRAWINGS

Further objects, features, and advantages of the present invention will become apparent upon the consideration of the following detailed description of the presently-preferred embodiment when taken in conjunction with the accompanying drawings, wherein:

FIG. 1 is a perspective view of a livestock watering tank embodying the present invention;

DETAILED DESCRIPTION OF THE PREFERRED EMBODIMENT

FIG. 1 shows a livestock watering tank 10 embodying the present invention, which includes a main tank 12 for receiving water for feeding livestock, a drinker tray 14 for the livestock to drink water from, a valve 18 for supplying water from main tank 12 to drinker tray 14 as needed, which includes a float valve for controlling the supply of water from main tank 12 to drinker tray 14 to maintain a predetermined water level in the drinker tray.

Main tank 12 and drinker tray 14 are formed from molded plastic to resist or prevent corrosion. The preferred materials are polyethylene or structural foam.

Figure 4:
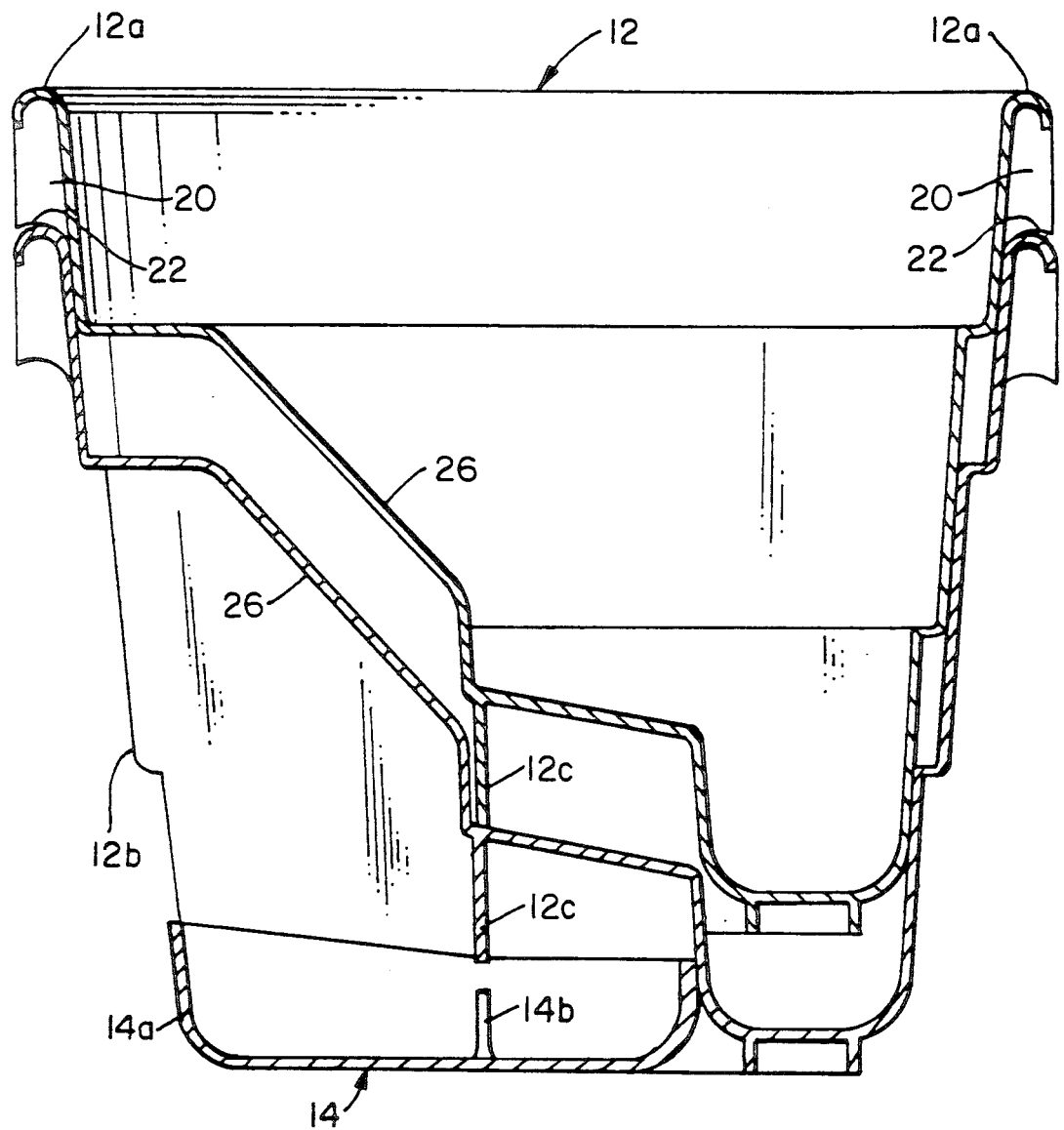
FIG. 4 is a cross-sectional view showing two tanks in their nested arrangement.

As shown in FIG. 4, main tank 12 is shaped so as to be nestable with other tanks, which makes them easy and less costly to ship and store. Tank 12 is substantially oval in shape and is provided with a curved upper surface 12a and integral nesting members or blocks 20, with two being formed on each sidewall of the tank and adjacent the upper surface 12a. Each nesting member 20 has a lower surface 22 for engaging and resting on upper curved surface 12a of tank 12. Thus, when nested, the tanks are spaced apart a predetermined distance equal to the height of nesting members 20, which is about 4 inches.

Figure 3:
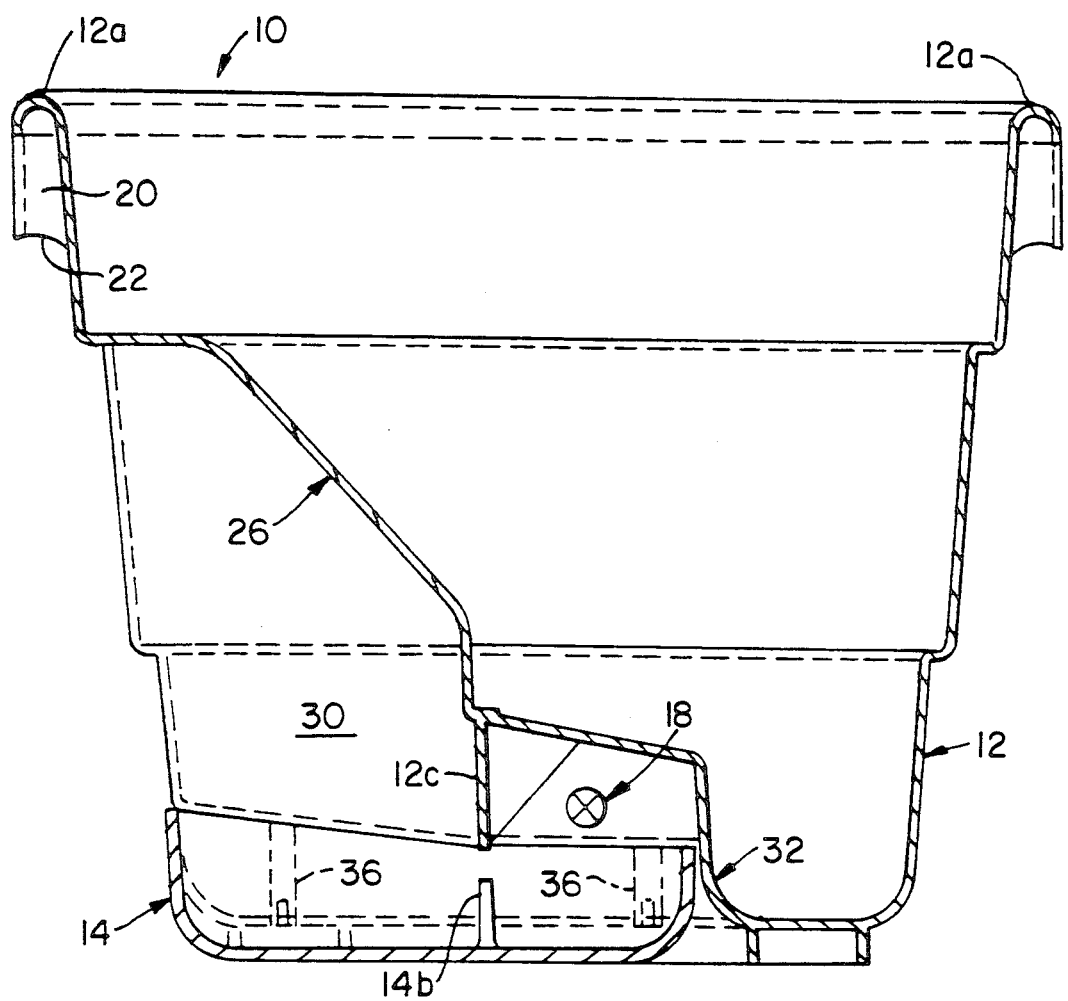
FIG. 3 is a cross-sectional view of the tank and tray.
Figure 2:
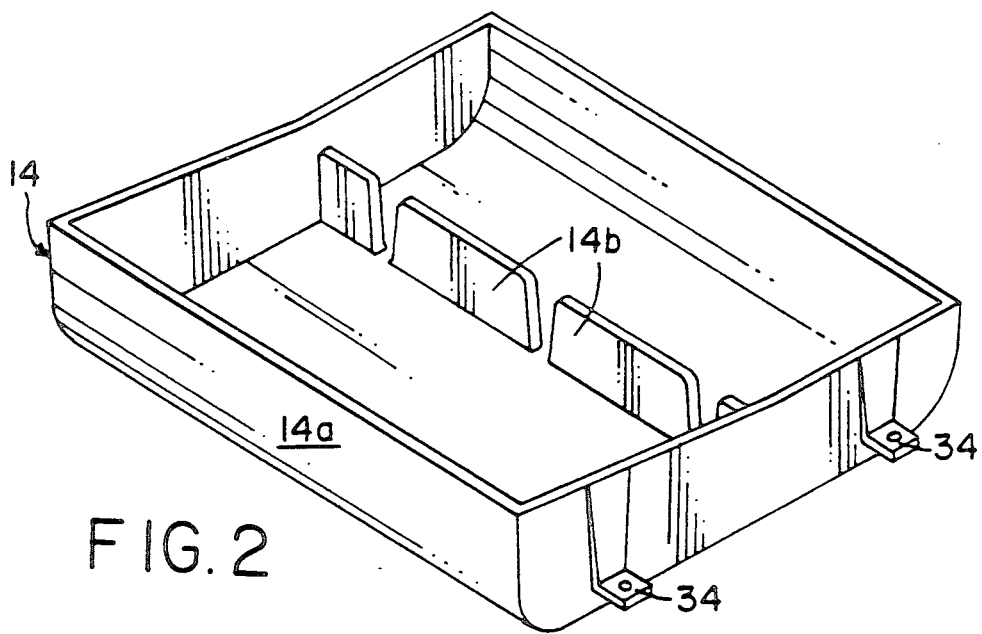
FIG. 2 is a perspective view of the drinker tray.

As shown in FIG. 3, one side of tank 12 is indented at 26 above drinker tray 14 to form an indented section 30 for receiving an animal's head to drink from the drinker tray 14. Below section 30, the tank 12 is shaped to form a compartment 32 for receiving drinker tray 14. Tray 14 is shaped to slide into compartment 32 at the bottom of tank 12. Screw-receiving holes 34 are provided on drinker tray 14, which line up with screw-receiving holes 36 on the bottom of tank 12, which allow drinker tray 14 to be bolted to tank 12 quickly and easily. When it is desired to clean tank 12 and tray 14, they are quickly and easily unscrewed to disassemble the parts for a quick and thorough washing and cleaning.

The outer wall 14a of tray 14 is substantially flush or coextensive with sidewall 12b of tank 12. In this manner, tray 14 and the water in it are protected, and to a large extent, this structure helps prevent the animals from dirtying the water and stepping into tray 14. Thus, tray 14 cooperates with indented section 30 to provide this advantageous structural arrangement to protect tray 14 and the water in it.

In addition, tray 14 includes baffles 14b which line up with baffle 12c formed on tank 12 to limit the extent to which the animal may insert its head for drinking from tray 14.

In accordance with the present invention, there is provided a livestock watering tank formed of plastic which resists corrosion, which is easy to disassemble and clean, which has long life expectancy, which resists breeding disease, and which is inexpensive to manufacture.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A livestock watering tank, comprising:
  a) a tank for receiving water for feeding livestock having sidewalls, a top and a bottom, said tank being formed of molded plastic to prevent corrosion;
  b) a drinker tray for livestock to drink water from, said drinker tray being formed of molded plastic and removably mounted on the bottom of said tank for quick disassembly and cleaning, said drinker tray having an outer wall substantially coextensive with one of the sidewalls of said tank, said one sidewall of said tank being indented above said drinker tray to form a recessed section for receiving an animal's head to drink from said drinker tray;

c) means for supplying water from said tank to said drinker tray;

d) a float valve for controlling the supply of water from said tank to said drinker tray; and e) said tank being shaped so as to be nestable with another tank and including nesting means formed on the side of said tank to allow said tank to nest within another tank and to space the tops of the tanks apart a predetermined amount.

2. A livestock watering tank in accordance with claim 1, wherein said tank and drinker tray and molded of a material selected from the group consisting of polyethylene or structural form.

3. A livestock watering tank in accordance with claim 1, wherein said tank has an upper surface, and said nesting means includes nesting members formed on the sidewalls of said tank and having nesting surfaces on their lower edges for engaging and resting on the upper surface of another tank.

4. A livestock watering tank in accordance with claim 1, wherein said tank includes a baffle, and said drinker tray includes one or more baffles which are aligned with the tank baffle to define a rear wall for said recessed section.

* * * * *

UNITED STATES PATENT AND TRADEMARK OFFICE
CERTIFICATE OF CORRECTION

PATENT NO. : 5,113,800
DATED : May 19, 1992
INVENTOR(S) : James L. Van Epps, II; Lynn Van Epps It is certified that error appears in the above—identified patent and that said Letters Patent is hereby corrected as shown below:

Column 3:

Claim 2, line 14, change "and" (second occurrence) to --are--.

Column 4:

Claim 2, line 2, change "form" to --foam--.

Signed and Sealed this

Sixth Day of July, 1993

MICHAEL K. KIRK

*Attest:*

*Attesting Officer*   Acting Commissioner of Patents and Trademarks